(12) United States Patent
Dal Pra' et al.

(10) Patent No.: US 9,126,650 B2
(45) Date of Patent: Sep. 8, 2015

(54) CONTROL DEVICE FOR A BICYCLE WITH CURVED HANDLEBARS

(75) Inventors: Giuseppe Dal Pra', Vicenza (IT); Andrea De Pretto, Piovene Rocchete-VI (IT)

(73) Assignee: Campagnolo S.r.l., Vicenza (IT)

( * ) Notice: Subject to any disclaimer, the term of this patent is extended or adjusted under 35 U.S.C. 154(b) by 793 days.

(21) Appl. No.: 12/275,858

(22) Filed: Nov. 21, 2008

(65) Prior Publication Data

US 2009/0133526 A1    May 28, 2009

(30) Foreign Application Priority Data

Nov. 23, 2007    (IT) .................................. M107A2230

(51) Int. Cl.
    *B62M 25/04*     (2006.01)
    *B62K 23/06*     (2006.01)
    *B62L 3/02*     (2006.01)

(52) U.S. Cl.
    CPC . *B62K 23/06* (2013.01); *B62L 3/02* (2013.01); *B62M 25/04* (2013.01); *Y10T 74/20438* (2015.01)

(58) Field of Classification Search
    USPC ...................... 74/473.14, 473.15, 489, 502.2; 188/24.11, 344
    IPC ........................................................ B62L 3/02
    See application file for complete search history.

(56) References Cited

U.S. PATENT DOCUMENTS

| | | | |
|---|---|---|---|
| 1,706,542 A | 3/1929 | Pugh et al. | |
| 2,384,728 A | 9/1945 | Crumble | |
| 2,586,604 A | 2/1952 | Bennett | |
| 2,770,980 A | 11/1956 | Millward | |
| 2,854,857 A | 10/1958 | Gleasman et al. | |
| 3,279,779 A | 10/1966 | Thomas et al. | |
| 3,760,648 A | 9/1973 | Hoffman | |
| 3,776,061 A | 12/1973 | Yoshigai | |
| 3,915,029 A | 10/1975 | Shimada | |
| 3,972,247 A | 8/1976 | Armstrong | |
| 4,002,350 A | 1/1977 | Timbs | |
| 4,075,871 A | 2/1978 | Burke | |
| 4,100,820 A * | 7/1978 | Evett | 74/489 |
| 4,319,673 A | 3/1982 | Kojima | |
| 4,454,784 A | 6/1984 | Shimano | |

(Continued)

FOREIGN PATENT DOCUMENTS

| | | |
|---|---|---|
| CH | 248133 | 4/1947 |
| CN | 1144761 | 3/1997 |

(Continued)

OTHER PUBLICATIONS

Chinese Office Action, Appl. No. CN 200610090826.7, dated Apr. 3, 2009.

(Continued)

*Primary Examiner* — Thomas Diaz
(74) *Attorney, Agent, or Firm* — Volpe Koenig, P.C.

(57) ABSTRACT

A control device for a bicycle with curved handlebars is described, comprising a support body fixable to the handlebars of the bicycle and a brake lever pivoted to the support body, a resisting arm of which integrally moves with an end of a brake cable, the support body having a grippable distal-upper projection, the brake lever having a first actuation area in a first riding condition gripping the support body, and a second actuation area in a second riding condition gripping the projection.

51 Claims, 7 Drawing Sheets

(56) References Cited

U.S. PATENT DOCUMENTS

| | | | |
|---|---|---|---|
| 4,459,871 | A | 7/1984 | Shimano |
| 4,605,240 | A | 8/1986 | Ciem et al. |
| 4,740,001 | A | 4/1988 | Torleumke |
| D298,309 | S | 11/1988 | Coue |
| 4,840,082 | A * | 6/1989 | Terashima et al. ............ 74/523 |
| 4,885,951 | A | 12/1989 | Desenclos et al. |
| 4,930,368 | A | 6/1990 | Nagano |
| 4,945,785 | A | 8/1990 | Romano |
| 4,966,046 | A | 10/1990 | Tagawa |
| 5,012,692 | A | 5/1991 | Nagano |
| 5,020,387 | A | 6/1991 | Nagano |
| 5,050,444 | A * | 9/1991 | Nishimura ............... 74/502.2 |
| 5,094,120 | A | 3/1992 | Tagawa |
| RE34,007 | E | 7/1992 | Desenclos et al. |
| 5,159,851 | A | 11/1992 | Rahmes |
| 5,186,071 | A | 2/1993 | Iwasaki |
| 5,203,213 | A | 4/1993 | Nagano |
| 5,213,005 | A | 5/1993 | Nagano |
| 5,222,412 | A | 6/1993 | Nagano |
| 5,241,878 | A | 9/1993 | Nagano |
| 5,257,683 | A | 11/1993 | Romano |
| 5,279,179 | A | 1/1994 | Yoshigai |
| 5,287,765 | A | 2/1994 | Scura |
| 5,303,608 | A | 4/1994 | Iwasaki |
| 5,400,675 | A | 3/1995 | Nagano |
| 5,479,776 | A | 1/1996 | Romano |
| 5,480,356 | A | 1/1996 | Campagnolo |
| 5,515,743 | A | 5/1996 | Lumpkin |
| 5,528,954 | A | 6/1996 | Yoshigai |
| 5,601,001 | A | 2/1997 | Kawakami et al. |
| 5,676,020 | A | 10/1997 | Jordan et al. |
| 5,676,021 | A | 10/1997 | Campagnolo |
| 5,676,022 | A | 10/1997 | Ose |
| 5,755,139 | A | 5/1998 | Kojima |
| 5,787,757 | A | 8/1998 | Ozaki |
| 5,791,195 | A | 8/1998 | Campagnolo |
| 5,806,372 | A | 9/1998 | Campagnolo |
| 5,832,782 | A | 11/1998 | Kawakami |
| 5,896,779 | A | 4/1999 | Biersteker et al. |
| 5,900,705 | A | 5/1999 | Kimura |
| 5,921,140 | A | 7/1999 | Lemmens et al. |
| 5,970,816 | A | 10/1999 | Savard |
| 6,073,730 | A | 6/2000 | Abe |
| 6,095,010 | A | 8/2000 | Arbeiter |
| 6,098,488 | A | 8/2000 | Vos |
| 6,370,981 | B2 | 4/2002 | Watarai |
| 6,457,377 | B1 | 10/2002 | Hsu |
| 6,502,477 | B1 | 1/2003 | Assel |
| 6,553,861 | B2 | 4/2003 | Ose |
| 6,564,670 | B2 | 5/2003 | Feng et al. |
| 6,564,671 | B2 | 5/2003 | Ose |
| 6,647,823 | B2 | 11/2003 | Tsumiyama et al. |
| 6,792,826 | B2 | 9/2004 | Dal Pra' |
| 7,100,471 | B2 | 9/2006 | Irie et al. |
| 2002/0078789 | A1 | 6/2002 | Chen |
| 2002/0104401 | A1 | 8/2002 | Dal Pra' |
| 2002/0124679 | A1 | 9/2002 | Dal Pra' |
| 2002/0139637 | A1 | 10/2002 | Tsumiyama et al. |
| 2003/0094064 | A1 | 5/2003 | Dal Pra' |
| 2003/0167871 | A1 | 9/2003 | Irie et al. |
| 2003/0177855 | A1 | 9/2003 | Tsumiyama et al. |
| 2004/0144193 | A1 | 7/2004 | Sato et al. |
| 2004/0237697 | A1 | 12/2004 | Kawakami |
| 2004/0237698 | A1 | 12/2004 | Hilsky et al. |
| 2005/0241428 | A1 | 11/2005 | Tsai |
| 2006/0070480 | A1* | 4/2006 | Fujii ........................... 74/502.2 |
| 2006/0207375 | A1 | 9/2006 | Jordan et al. |
| 2006/0272443 | A1 | 12/2006 | Tsumiyama |
| 2007/0034037 | A1 | 2/2007 | Dal Pra' et al. |
| 2007/0068332 | A1* | 3/2007 | Fujii et al. ................ 74/551.8 |
| 2007/0137388 | A1 | 6/2007 | Dal Pra' |
| 2007/0137391 | A1 | 6/2007 | Fujii |
| 2007/0178715 | A1* | 8/2007 | Fujii ............................. 439/34 |
| 2007/0186715 | A1 | 8/2007 | Dal Pra' |
| 2007/0193386 | A1 | 8/2007 | Fujii |
| 2007/0204716 | A1 | 9/2007 | Dal Pra' |
| 2008/0098848 | A1 | 5/2008 | Dal Pra' et al. |
| 2008/0196537 | A1 | 8/2008 | Dal Pra' |
| 2008/0210041 | A1 | 9/2008 | Dal Pra' et al. |
| 2008/0210042 | A1 | 9/2008 | Dal Pra' |
| 2009/0025504 | A1 | 1/2009 | Dal Pra' et al. |
| 2009/0031846 | A1 | 2/2009 | Dal Pra' et al. |
| 2009/0133526 | A1 | 5/2009 | Dal Pra' et al. |

FOREIGN PATENT DOCUMENTS

| | | |
|---|---|---|
| CN | 2436412 | 6/2001 |
| CN | 1443679 | 9/2003 |
| CN | 1550405 | 12/2004 |
| DE | 3136922 | 3/1983 |
| DE | 3706545 | 9/1988 |
| DE | 19607640 | 1/1997 |
| DE | 202006006796 | 8/2006 |
| EP | 0371254 | 6/1990 |
| EP | 0478901 | 4/1992 |
| EP | 0504118 | 9/1992 |
| EP | 0504118 A1 | 9/1992 |
| EP | 0361335 | 2/1994 |
| EP | 0601211 | 6/1994 |
| EP | 0601221 | 6/1994 |
| EP | 0635422 | 1/1995 |
| EP | 0504118 | 4/1995 |
| EP | 0714826 | 6/1996 |
| EP | 0744334 | 11/1996 |
| EP | 0790175 | 8/1997 |
| EP | 1123861 | 8/2001 |
| EP | 1134158 | 9/2001 |
| EP | 1245483 | 10/2002 |
| EP | 0785128 | 11/2002 |
| EP | 1264765 | 12/2002 |
| EP | 1342655 | 9/2003 |
| EP | 1440878 | 7/2004 |
| EP | 1449756 | 8/2004 |
| EP | 1473220 | 11/2004 |
| EP | 1481883 | 12/2004 |
| EP | 1502847 | 2/2005 |
| EP | 1535829 | 6/2005 |
| EP | 1564131 | 8/2005 |
| EP | 1642823 | 4/2006 |
| EP | 1642823 A2 | 4/2006 |
| EP | 1698550 | 9/2006 |
| EP | 1698551 A2 | 9/2006 |
| EP | 1705110 A1 | 9/2006 |
| EP | 1739001 | 1/2007 |
| EP | 1816066 | 8/2007 |
| EP | 1826111 | 8/2007 |
| FR | 960276 | 4/1950 |
| FR | 2777528 | 10/1999 |
| FR | 2777528 A | 10/1999 |
| FR | 9805066 | 10/1999 |
| FR | 2861686 | 2/2006 |
| GB | 615173 | 1/1949 |
| GB | 2012893 | 8/1979 |
| JP | 58003987 | 6/1956 |
| JP | 51060342 | 5/1976 |
| JP | 17893 | 1/1982 |
| JP | 17894 | 1/1982 |
| JP | 58030884 A | 2/1983 |
| JP | 224879 | 12/1983 |
| JP | 59094989 UA | 6/1984 |
| JP | 60107475 | 6/1985 |
| JP | 639516 Y2 | 3/1988 |
| JP | 157092 | 10/1989 |
| JP | 2088384 | 3/1990 |
| JP | 03292280 | 12/1991 |
| JP | 04331689 | 11/1992 |
| JP | 05097088 A | 4/1993 |
| JP | 05082786 | 11/1993 |
| JP | 05286476 | 11/1993 |
| JP | 06016170 | 1/1994 |
| JP | 07033063 A | 2/1995 |
| JP | 07251784 | 10/1995 |
| JP | 08328679 A | 12/1996 |
| JP | 10147263 A | 6/1998 |

(56) References Cited

FOREIGN PATENT DOCUMENTS

| JP | 2006103674 A | 4/2006 |
|---|---|---|
| JP | 2007223594 A | 9/2007 |
| JP | 61241287 | 10/2007 |
| TW | 136125 Y | 6/1990 |
| TW | 510875 | 11/2002 |
| TW | 519089 | 1/2003 |
| TW | 570013 Y | 1/2004 |
| TW | 1223636 | 11/2004 |
| TW | 200505732 A | 2/2005 |
| TW | M290134 U | 5/2006 |
| TW | 200709988 A | 3/2007 |
| TW | I279353 B | 4/2007 |
| TW | 200738512 A | 10/2007 |
| TW | I289127 B | 11/2007 |
| WO | 9218374 | 10/1992 |
| WO | 03093094 | 11/2003 |
| WO | 2005044656 | 5/2005 |

OTHER PUBLICATIONS

Chinese Office Action, Appl. No. CN 200710005823.3, dated Sep. 25, 2009.
Chinese Office Action, Appl. No. CN 200810082341.2, dated Nov. 30, 2010.
European Search Report, Appl. No. EP 05425458.6, dated Nov. 16, 2005.
European Search Report, Appl. No. EP 05017003.4, dated Dec. 20, 2005.
European Search Report, Appl. No. 06003694.4, dated Jul. 31, 2006.
European Search Report, Appl. No. RS 144832, dated Apr. 16, 2007
European Search Report, Appl. No. RS 115409, dated Jul. 18, 2007.
European Search Report, Appl. No. RS 115410, dated Jul. 31, 2007.
European Search Report, Appl. No. RS115682, dated Oct. 30, 2007.
European Search Report, Appl. No. 08003760.9, dated Jun. 27, 2008.
European Search Report, Appl. No. EP 08003755.9, dated Jun. 27, 2008.
European Search Report, Appl. No. EP 08022485.0, dated Jul. 2, 2009.
European Search Report, Appl. No. 08005438.0, dated Nov. 5, 2010.
Japanese Office Action, Appl. No. JP 2002-332045, dated Dec. 16, 2008.
Japanese Office Action, Appl. No. JP 2008-550914, dated May 24, 2011.
English Translation of Japanese Office Action, Appl. No. 2006-176333, dated Aug. 23, 2011.
Taiwan Search Report, Appl. No. 096101651, dated Oct. 5, 2011.
Taiwan Office Action and Search Report, Appl. No. 095121477, dated Nov. 25, 2011.
European Search Report, Appln. No. EP 08005438.0-2425/2062809, dated Nov. 5, 2010.
Japanese Office Action for Application No. 2008-297977 dated Nov. 27, 2012 (with English translation).
English translation of Taiwanese Office Action and Search Report issued May 28, 2013 in corresponding Taiwanese Patent Application No. 097145163.

\* cited by examiner

CONTROL DEVICE FOR A BICYCLE WITH CURVED HANDLEBARS

FIELD OF INVENTION

The present invention relates to a control device for a bicycle with curved handlebars, typical of racing bicycles.

BACKGROUND

Typical control devices feature a support body fixable to the handlebars of the bicycle and a brake lever pivotally attached thereto. The brake lever comprises a resisting arm to which an end of a brake cable is attached, typically an inextensible sheathed cable (Bowden cable). When the brake lever is actuated by bringing its power arm towards the handlebars, the resisting arm of the brake lever moves away from the handlebars, and the resulting tension on the brake cable actuates the brake, thus clamping its jaws around the rim of the wheel. In some of these control devices, so-called integrated devices, there are also one or more levers and/or one or more buttons to actuate a derailleur of the bicycle gearshift.

In one riding condition, the cyclist grips the handlebars. Such a riding position is the most favorable for braking, both because the actual power arm is at its maximum, and because the cyclist acts upon the lever with the fingers other than the thumb, and in particular with the forefinger and the middle finger, starting from a condition in which the hand is substantially open.

In another riding condition, the cyclist grips the support body itself, resting the palm of the hand on its top surface. The actuation of the brake lever is still efficient, because the power arm is still sufficiently long, and the cyclist starts from a condition in which the hand is only partially closed.

From this riding condition, in order to avoid the cyclist's hand sliding forwards away from the support body losing its grip, control devices are known wherein the support body is provided with a small projection in a distal-upper position. However these projections are not grippable. Also known are control devices wherein the support body includes a horn-shaped projection, arched inwards, which are intended to support a display device, and are therefore not grippable.

Control devices are known wherein the projection of the support bodies is extended in order to facilitate gripping in yet another riding condition. Some of these devices feature a grippable horn-shaped projection, arched inwards. However, in order to actuate the brake lever from the riding condition in which the cyclist grips the projection by resting the palm of the hand on its proximal surface and closing the fingers around the projection itself, the cyclist must however actually release his/her grip, opening the fingers and sliding the palm on the top surface of the support body. In short, braking is only possible if the cyclist positions himself/herself in the above described riding condition in which the cyclist grips the support body.

Therefore, there remains a need for a control device for a bicycle with curved handlebars that is particularly versatile and safe with regard to the riding and braking conditions.

SUMMARY

The invention relates to a control device for a bicycle with curved handlebars. The control device comprises a support body having a grippable distal upper projection, and fixable to the handlebars of the bicycle, and a brake lever pivotally mounted to the support body, a resisting arm of which, integrally moves with an end of a brake cable. The brake lever has a first actuation area in a first riding condition gripping the support body, and a second actuation area in a second riding condition gripping the projection. A third actuation area may also be incorporated into the brake lever for use in a third riding condition.

The invention also relates to a brake lever for a bicycle with curved handlebars. The brake lever features a pivot pin, a resisting arm with which an end of a brake cable integrally moves, and a power arm. The power arm comprises an upper portion having a concavity facing towards the distal side, an intermediate portion having a convexity facing towards the distal side, and a bottom portion having a concavity facing towards the distal side. The brake lever has a first actuation area comprising the intermediate portion and the bottom portion, and a second actuation area comprising the upper portion and the intermediate portion.

BRIEF DESCRIPTION OF THE DRAWINGS

Further characteristics and advantages of the invention shall become clearer from the description of a preferred embodiment thereof, made with reference to the attached drawings, wherein.

DETAILED DESCRIPTION OF THE PREFERRED EMBODIMENTS

Introduction to the Embodiments

Figure 1:
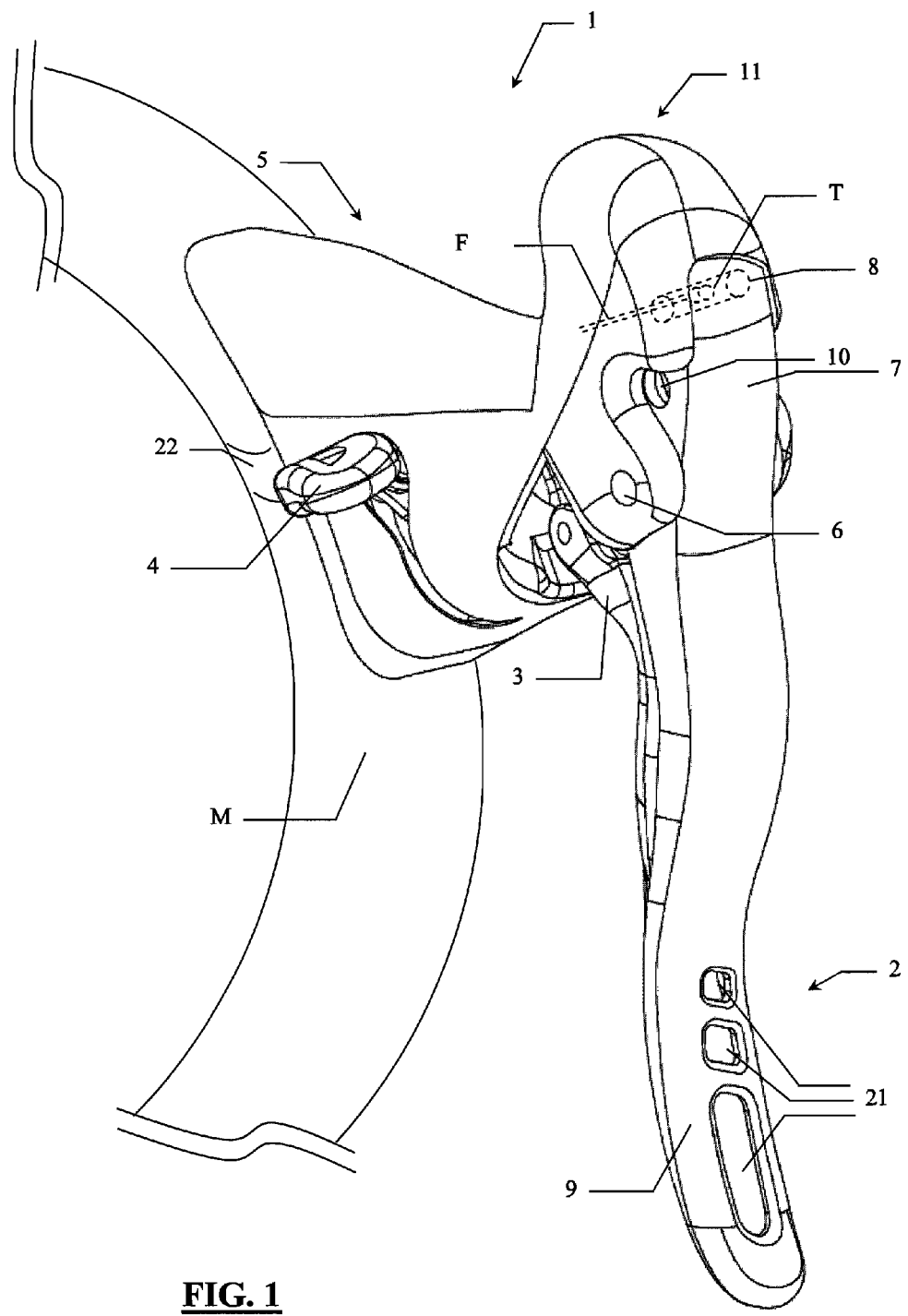
FIG. 1 shows a perspective view of a control device according to the invention.

In the present introduction and description, and in the attached claims, all spatial references such as vertical, horizontal, distal, proximal, top, bottom, inner and outer are made with reference to the condition of the support body fixed to the handlebars; in particular, by proximal, facing towards the handlebars is meant, while by distal, facing away from the handlebars is meant, by inner, facing towards the center of the handlebars is meant, while by outer, facing away from the center of the handlebars is meant.

The support body is more specifically fixable projecting distally from the curved ends of the handlebars, so that the brake lever hangs substantially vertically therefrom, in front of the curved ends of the handlebars.

The invention relates to a control device for a bicycle with curved handlebars. The control device comprises a support body having a grippable distal-upper projection fixable to the handlebars of the bicycle, and a brake lever pivoted to the support body, a resisting arm of which integrally moves with an end of a brake cable. The brake lever comprises a first actuation area in a first riding condition gripping the support body, and a second actuation area in a second riding condition gripping the projection. In an alternate embodiment, a third actuation area may also be incorporated into the brake lever for use in a third riding condition.

The projection preferably projects further inwards with respect to the inner side of the support body, forming a recess intended to receive the cyclist's thumb in said second riding condition. Through such a recess, a small rotation of the wrist is caused, and consequently the fingers other than the thumb, or at least the middle finger, ring finger and little finger close, in a lowered position, below the projection itself. Preferably, the projection projects inwards with respect to the inner side of the support body by a distance at its upper end comprised between 2 and 12 mm, more preferably between 4 and 8 mm, and even more preferably of 6.5 mm.

In a preferred embodiment, the projection is convex in a distal-outer part thereof. Such a convexity preferably has a radius of curvature comprised between 30 and 45 mm, more preferably between 33 and 38 mm, even more preferably of 35 mm.

It is also preferred that the projection is convex in an upper-outer part thereof. The convexity is preferred to have a radius of curvature comprised between 10 and 30 mm, more preferably between 13 and 20 mm, even more preferably of 15 mm.

Preferably, the projection has a distal surface extending above the brake lever. Such a distal surface advantageously provides a rest for the cyclist's forefinger, to improve the grip in the second riding condition, possibly also during braking. Preferably, said distal surface extends for a height comprised between 5 and 30 mm, more preferably between 10 and 20 mm, and even more preferably of 14 mm.

A pivot pin of the brake lever is below and a first distance from the upper surface of the support body comprised between 0 and 15 mm, more preferably between 3 and 10 mm, even more preferably of 6 mm. Because this distance is particularly short, it is possible to make a brake lever that works in mechanically advantageous conditions from all riding conditions.

Preferably, the ratio between the distance of the point of application of the middle finger within the first actuation area from the top surface of the support body and said first distance is greater than 3.3, more preferably it is greater than 7 and even more preferably it is 10.

Preferably, the ratio between the distance of the point of application of the middle finger within the second actuation area from the upper surface of the support body and said first distance is greater than 1, more preferably it is greater than 3, and even more preferably it is 5.

Preferably, the distance between a pivot pin of the brake lever and a point of integral movement of the brake cable and the brake lever is comprised between 20 and 30 mm, more preferably between 23 and 27 mm, even more preferably it is 24.6 mm.

Preferably, the ratio between the distance of the point of application of the middle finger within said first actuation area from a pivot pin of the brake lever and the distance between the pivot pin of the brake lever and a point of integral movement of the brake cable and the brake lever is comprised between 1.5 and 3.3, more preferably between 2 and 2.5, and even more preferably it is 2.26.

Moreover, the ratio between the distance of the point of application of the middle finger within said second actuation area from a pivot pin of the brake lever and the distance between the pivot pin of the brake lever and a point of integral movement of the brake cable and the brake lever is preferably comprised between 0.6 and 1.9, more preferably between 0.8 and 1.4, and even more preferably it is 1.13.

It is envisioned that the first actuation area and the second actuation area overlap for at least 30%, more preferably for at least 50%.

The brake lever, at the first actuation area, has an upper portion having a convexity facing towards the distal side, and a bottom portion having a concavity facing towards the distal side. As a result, the middle finger rests in an area with an inclination of the brake lever from distal-upper to proximal-bottom, which is particularly advantageous for the application of force that must be exerted on the brake lever in the first riding condition.

Preferably, the portion with convexity facing towards the distal side of the brake lever has a radius of curvature comprised between 47 and 60 mm, preferably between 50 and 56 mm, even more preferably of 53 mm, and the portion with concavity facing towards the distal side has a radius of curvature comprised between 50 and 62 mm, more preferably between 53 and 59 mm, even more preferably of 56 mm.

At the second actuation area, the brake lever preferably has an upper portion having a convexity facing towards the distal side, an intermediate portion having a concavity facing towards the distal side, and a bottom portion having a convexity facing towards the distal side. As a result, the middle finger rests in an area with an inclination of the brake lever from proximal-upper to distal-bottom, which is particularly advantageous for the pushing action that has to be exerted onto the brake lever in the second riding condition.

Preferably, the top portion has a radius of curvature comprised between 45 and 55 mm, preferably between 48 and 52 mm, even more preferably of 50 mm, the intermediate portion has a radius of curvature comprised between 30 and 38 mm, more preferably between 32 and 36 mm, even more preferably of 34 mm, and the bottom portion has a radius of curvature comprised between 47 and 60 mm, more preferably between 50 and 56 mm, even more preferably of 53 mm.

In another preferred embodiment, the brake lever further has a third actuation area in a third riding condition gripping the handlebars. The third actuation area preferably has a concavity facing towards the distal side, which is particularly advantageous in applying the force that has to be exerted onto the brake lever. Preferably, the portion with concavity facing towards the distal side of the brake lever has a radius of curvature comprised between 50 and 62 mm, more preferably between 53 and 59 mm, even more preferably of 56 mm.

Typically, the end of the brake cable is made to integrally move with the brake lever through insertion of a head thereof in an idle pin fixed to the brake lever.

Preferably the brake lever has one or more weight reduction holes.

In a second aspect thereof, the invention concerns a brake lever for a bicycle with curved handlebars, having a pivot pin, a resisting arm with which an end of a brake cable integrally moves, and a power arm. The power arm has an upper portion having a concavity facing towards the distal side, an intermediate portion having a convexity facing towards the distal side, and a bottom portion having a concavity facing towards the distal side. The brake lever has a first actuation area comprising said intermediate portion and said bottom portion, and a second actuation area comprising said upper portion and said intermediate portion.

In another preferred embodiment, the brake lever also has a third actuation area comprising said bottom portion.

In the preferred arrangement, the upper portion has a length comprised between 18 and 22 mm, more preferably of 20 mm. The intermediate portion has a length comprised between 38 and 46 mm, more preferably of 42 mm. And the bottom portion has a length comprised between 52 and 64 mm, more preferably of 58 mm.

The resisting arm of the brake lever has an upper portion having a concavity facing towards the distal side, and a bottom portion having the convexity facing towards the distal side. It is preferred that the upper portion of the resisting arm has a length comprised between 30 and 40 mm, more preferably of 35 mm.

In any of the above described embodiments, it is preferred that that the brake lever has one or more weight reduction holes.

Preferred values of the radii of curvature of the brake lever and other advantageous characteristics thereof are indicated above with reference to the control device of the invention.

DETAILED DESCRIPTION

FIGS. 1-4 illustrate a control device 1 for a bicycle with curved handlebars M according to the invention. The control device 1 is a left control device, having a brake lever 2 typically intended to control the front brake. The control device 1 is more specifically an integrated control device, further comprising a lever 3 and a button lever 4 typically used for controlling the front derailleur of the bicycle. A right control device, typically intended to control the rear brake and possibly the rear derailleur of the bicycle, mirrors the illustrated control device 1, and therefore it is not shown and described herein.

The control device 1 comprises a support body 5 fixable to the handlebars M, through suitable means such as a clamp 22, at the curved left end of the handlebars M, so as to distally project from the handlebars M.

The brake lever 2 is pivoted about a pivot pin 6 extending substantially horizontally in a distal position of the support body 5.

The brake lever 2, above the pivot pin 6, has a resisting arm 7. An end of the brake cable F is attached close to an end of the resisting arm 7 and moves integrally therewith. More specifically, a head T at the end of the brake cable F is inserted into a transversal hole of an idle pin 8, in a per se well known way.

The idle pin 8 is at a distance L1 (FIG. 2) from the pivot pin 6 of the brake lever 2, this distance L1 representing the actual resisting arm of the brake lever 2.

Below the pivot pin 6, the brake lever 2 has an actuation arm 9 hanging from the support body 5 substantially vertically, in front of the curved end of the handlebars M.

The brake lever 2 further has a per se known stop device 10, which allows the brake lever 2 to move between a rest position and a release position. From the rest position the actuation arm 9 moves towards the handlebars M, and therefore the resisting arm 7 moves away from the handlebars M, causing the actuation of the brake through the traction of the brake cable F through the idle pin 8, integrally moving with the brake lever 2. In the release position, the actuation arm 9 is moved further away from the handlebars M, and therefore the resisting arm 7 is brought closer to the handlebars with respect to the rest position, to allow the brake cable F to be detensioned and therefore allow the jaws of the brake to be widened and promote the disassembly operations of the wheel.

The support body 5 has a distal-upper projection 11. The projection 11 projects for a height H1 (FIG. 2) from a substantially flat upper surface 12 of the support body 5.

Figure 3:
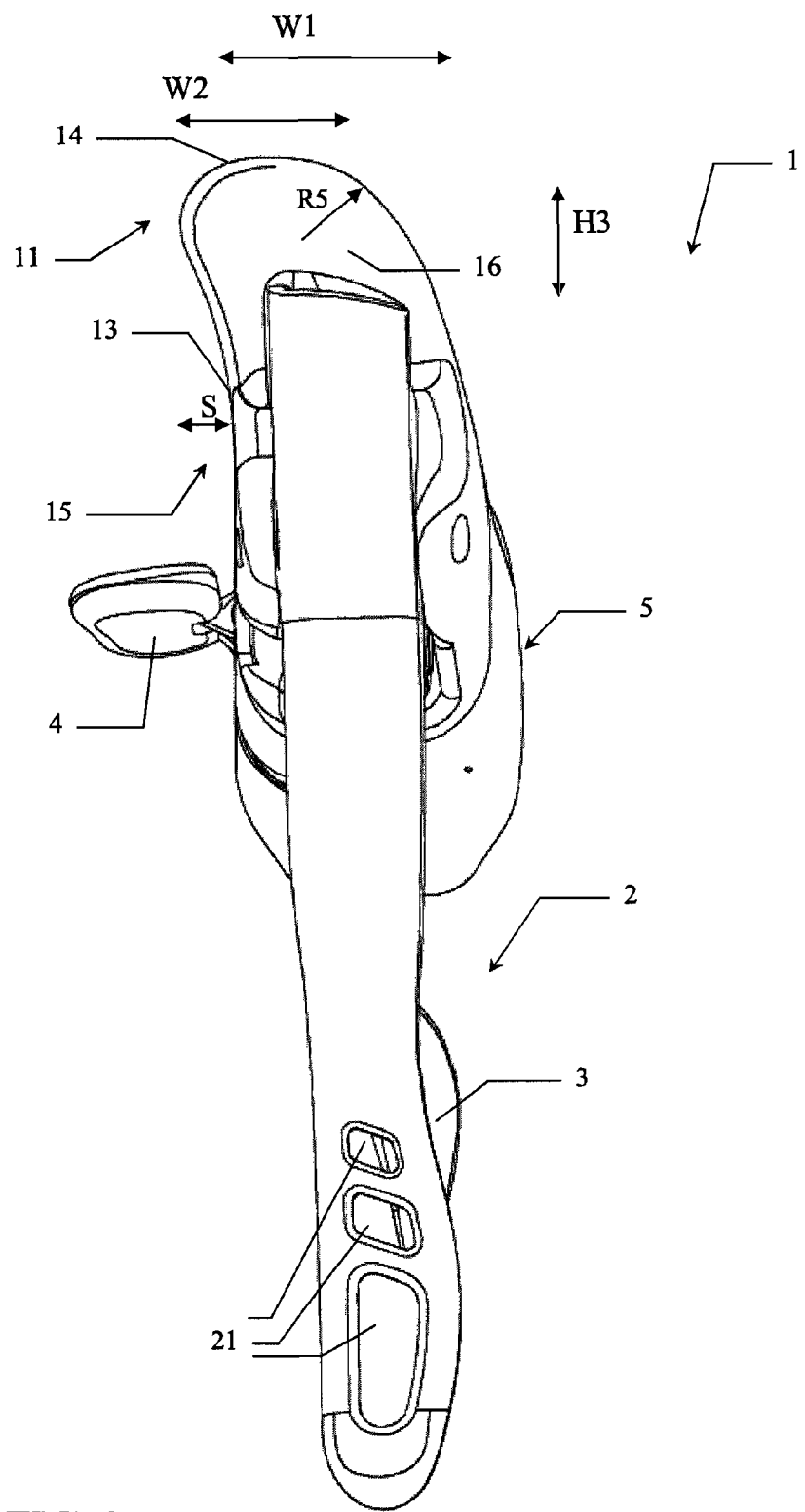
FIG. 3 shows the control device of FIG. 1 in a view from the distal side.
Figure 4:
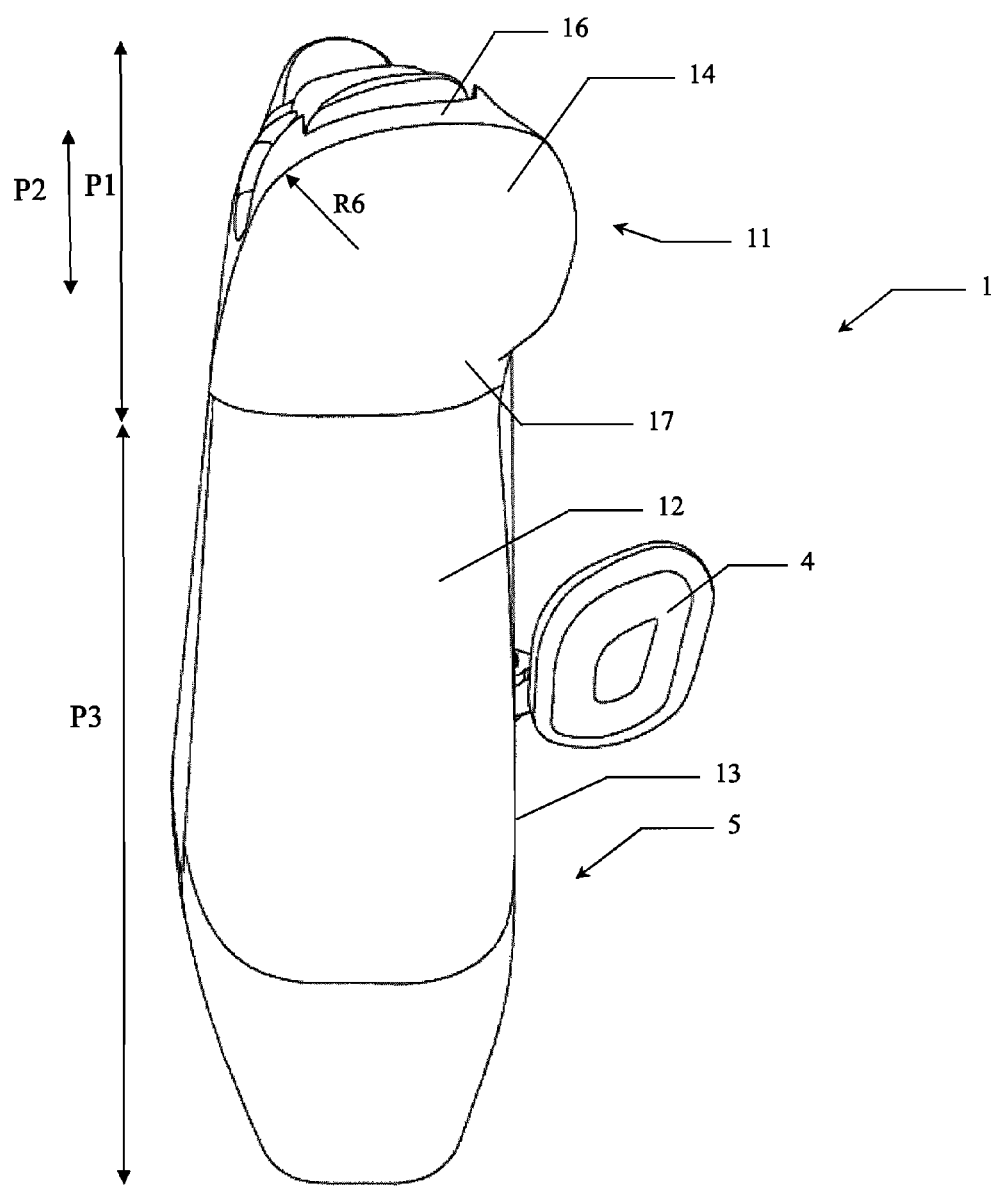
FIG. 4 shows the control device of FIG. 1 in a top view.

As can be seen in FIG. 3, the projection 11 projects inwardly with respect to an inner side 13 of the support body up to a distance S at its upper end 14, forming a recess 15 of the control device 1. In its distal-outer part, the projection 11 is convex with radius of curvature R5.

The projection 11 has a width W1 at the base corresponding to the width of the support body 5, and a width W2 at its upper end 14 slightly smaller than the width W1 at the base.

As shown in FIG. 3, widths W1 and W2 are measured in a direction extending from an inner side of the projection 11, proximal to the inner side 13 of the support body 5, to an outer surface of the projection 11.

Figure 2:
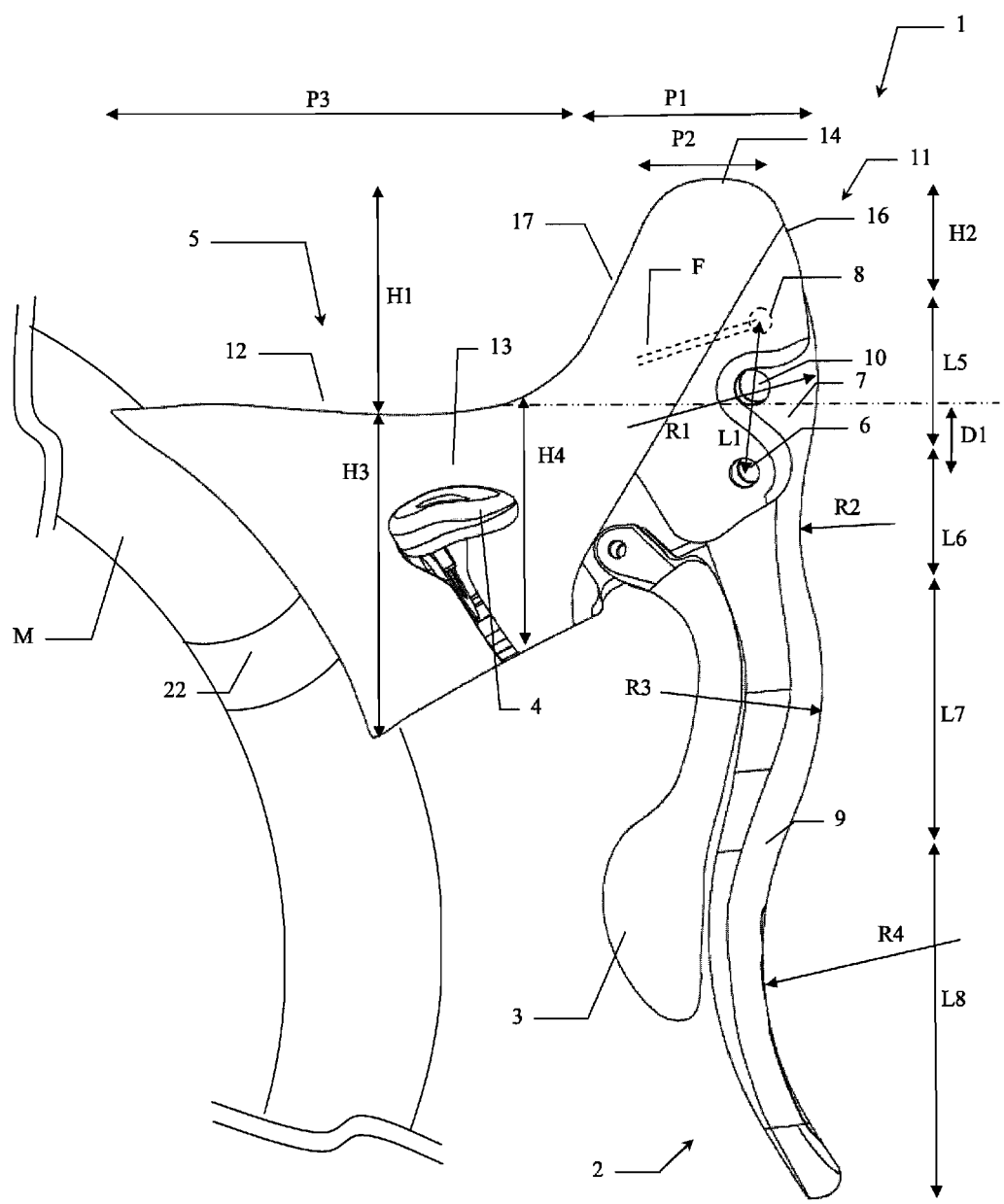
FIG. 2 shows the control device of FIG. 1 in a view from the inner side.

The projection 11 has a length P1 (FIG. 4) at the base, and a length P2 at its upper end 14 much smaller than the length P1 at the base. As shown in FIG. 2, lengths P1 and P2 are measured in a direction extending from a proximal surface 17 to a distal surface 16 of the projection 11. In its outer upper part, the projection 11 is convex with radius of curvature R6. The projection 11 therefore has an overall rounded horn shape.

Referring generally to FIG. 2, the pivot pin 6 of the brake lever 2 is below and at a distance D1 from the upper surface 12 of the support body 5.

The resisting arm 7 of the brake lever 2 extends substantially for its entire length in a distal cavity (not shown) of the projection 11, but not for the entire height H1 of the projection 11. In other words, the projection 11 has a distal surface 16 extending for a height H2 above the brake lever 2. The projection 11 also has a proximal surface 17 smoothly fitted to the upper surface 12 of the support body 5.

The support body 5 has a length P3 at its upper surface 12, a height that slightly decreases from a height H3 at the proximal side to a height H4 at the beginning of the projection 11 and, as stated above, a width W1 (FIG. 3).

The brake lever 2, in particular its distal surface, has a curvilinear progression. Substantially the entire length of its resisting arm 7 has a convexity towards the distal side, with radius of curvature R1 for a portion of length L5. At the pivot pin 6, the brake lever has a concavity towards the distal side, with curvature R2 for a portion of length L6. The portion of the actuation arm 9 adjacent to the pivot pin 6 has a convexity towards the distal side, with radius of curvature R3 for a portion of length L7. The remaining portion of the actuation arm 9, or free end, has a concavity towards the distal side, with radius of curvature R4 for a portion of length L8. The various curvatures are smoothly fitted at inflection points.

The brake lever 2 further has one or more weight reduction holes 21.

The brake lever 2 of the control device 1 is actuatable from three distinct riding conditions of the cyclist.

Figure 5:
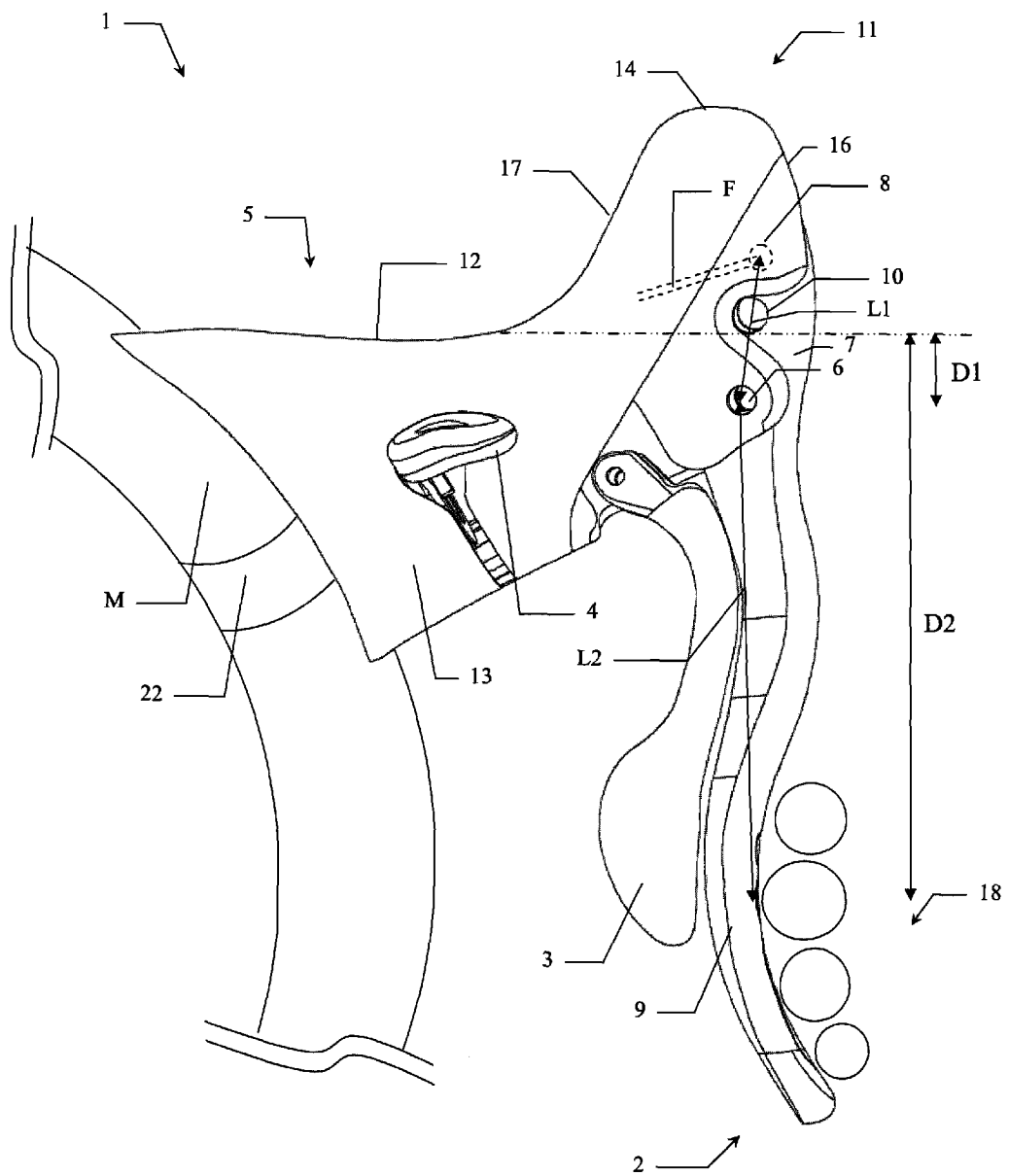
FIG. 5 shows the control device of FIG. 1 in a gripping and braking condition.

In one riding condition, shown in FIG. 5, the cyclist grips the curved end of the handlebars M, on which the palm rests. The thumb can be closed around the handlebars M. The four fingers other than the thumb can also be closed around the handlebars M during riding. In order to be ready to brake, the cyclist opens one or more of the four fingers other than the thumb and places them around the brake lever 2 in an actuation area 18 comprising the portion of concavity of radius of curvature R4 and length L8. More specifically, the concavity towards the distal side of the brake lever 2 is particularly advantageous for applying the force that has to be exerted on the brake lever 2 by the cyclist in such a riding condition.

The actual power arm relative to this riding condition, meant as the distance between the pivot pin 6 and the central point of application of force through the middle finger, is indicated with L2. It should be noted that the actual position of the fingers and in particular of the middle finger, can vary between cyclists, and therefore the actual power arm L2 can slightly vary according to the size of the cyclist's hand. The distance between the point of application of force and the upper surface 12 of the support body 5 is indicated with D2.

Such a riding position is the most favorable for braking, both because the actual power arm L2 is at its maximum, and because the cyclist acts upon the lever 2 starting from a condition in which the hand is substantially open.

Figure 6:
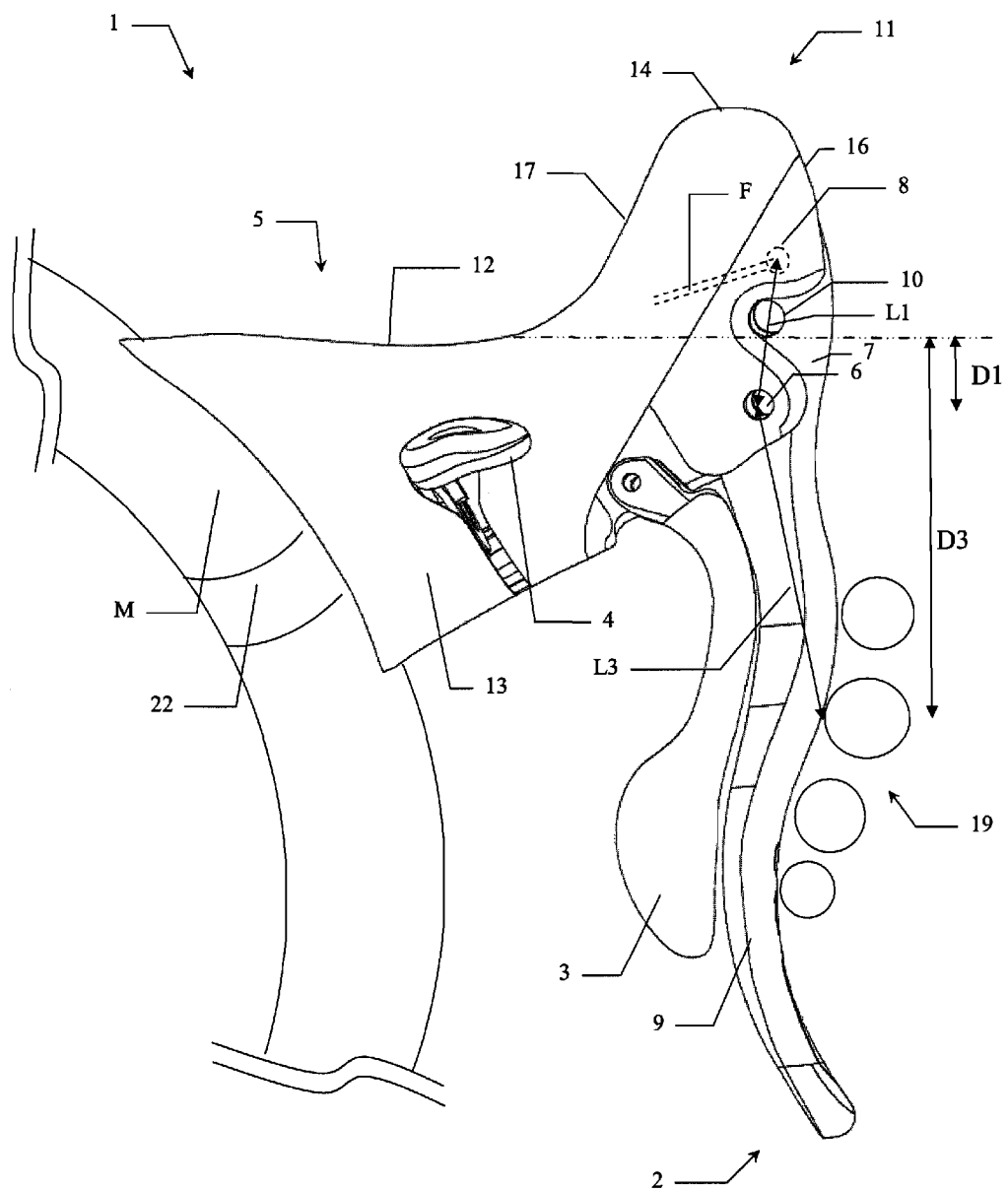
FIG. 6 shows the control device of FIG. 1 in another gripping and braking condition.

In another riding condition, shown in FIG. 6, the cyclist grips the support body 5, resting the palm of his/her hand on its upper surface 12 and the thumb on the inner side 13 of the support body 5. The projection 11 advantageously performs the function of preventing slipping of the cyclist's hand in the distal direction away from the support body 5.

The four fingers other than the thumb, or at least the little finger and/or the ring finger, can be closed around the support body 5 during riding. In order to be ready for braking, the cyclist places one or more of the four fingers other than the thumb, typically the forefinger and the middle finger, around the brake lever in an actuation area 19 comprising part of the portion of convexity of radius of curvature R3 and length L7, and part of the portion of concavity of radius of curvature R4 and length L8. More specifically, the middle finger rests in the bottom area of the portion of convexity of radius of curvature R3 or in the upper area of the portion of concavity of radius of curvature R4, and therefore in an area with an inclination of the brake lever 2 from distal-upper to proximal-bottom. This inclination is particularly advantageous for applying the force that has to be exerted on the brake lever 2 by the cyclist in this riding condition.

The actual power arm relative to this riding position, again meant as the distance between the pivot pin 6 and the central point of application of force through the middle finger, is indicated with L3. As noted above, the actual position of the fingers and in particular of the middle finger, and therefore the actual power arm L3 can slightly vary according to the size of the cyclist's hand. The distance between this point of application of force and the upper surface 12 of the support body 5 is indicated with D3.

The actuation of the brake lever 2 from this riding condition in which the cyclist grips the support body 5 is in general still easy, since the actual power arm L3 remains sufficient and the cyclist starts from a condition in which the hand is only partially closed.

Figure 7:
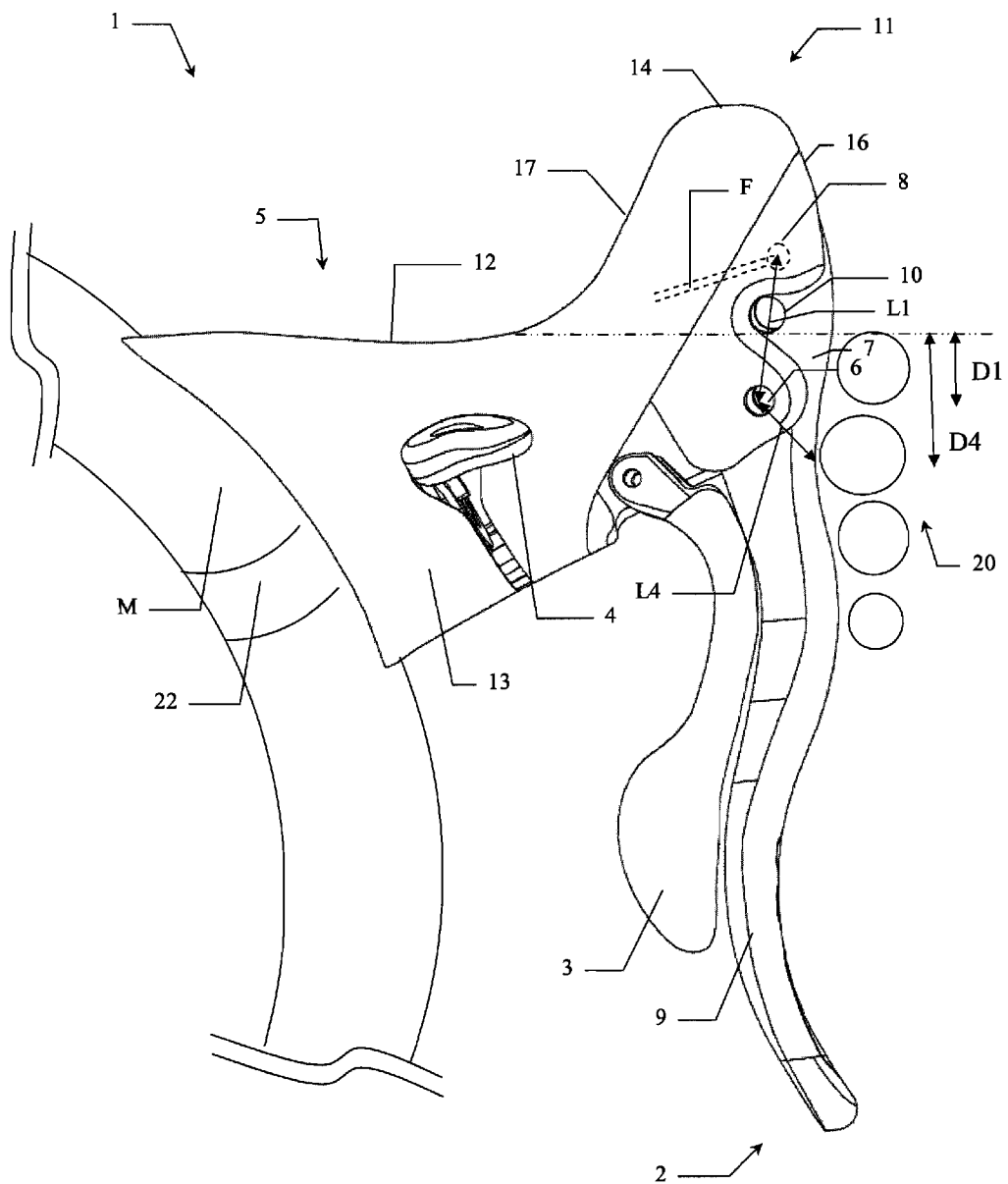
FIG. 7 shows the control device of FIG. 1 in still another gripping and braking condition.

In yet another riding condition, shown in FIG. 7, the cyclist grips the projection 11, resting the palm of the hand on its proximal surface 17 and the thumb in the recess 15 of the control device 1. Due also to the inclination of the projection 11 and to the recess 15, a small rotation of the wrist is caused and the fingers other than the thumb consequently close around the brake lever 2, with the fingers, except for the forefinger, substantially all below the pivot pin 6.

The convexities of the projection 11 make it easier for it to be gripped and for the brake lever 2 to be reached with the hand fingers in this riding condition. Specifically, the four fingers other than the thumb are closed around the brake lever 2 in an actuation area 20 comprising part of the portion of convexity of radius of curvature R1, the portion of concavity of radius of curvature R2, and part of the portion of convexity of radius of curvature R3. More specifically, the middle finger rests in a bottom area of the portion of concavity R2 or in an upper area of the portion of convexity R3 of the brake lever 2, and therefore in an area with an inclination of the brake lever 2 from proximal-upper to distal-bottom. This inclination is particularly advantageous for the pushing action that has to be exerted on the brake lever 2 by the cyclist in this riding condition.

In order to improve the grip, the cyclist's forefinger can also be closed around the distal surface 16 of the projection 11, both during normal riding and also during braking.

The actual power arm relative to this riding position, again meant as the distance between the pivot pin 6 and the central point of application of force through the middle finger, is indicated with L4. Also in this case, the actual position of the fingers and in particular of the middle finger, and therefore the actual power arm L4 can slightly vary according to the size of the cyclist's hand. The distance between such a point of application of force and the upper surface 12 of the support body 5 is indicated with D4.

The actuation of the brake lever 2 from this riding condition in which the cyclist grips the projection 11 is in general still easy, because the actual power arm L4 is still sufficient and the cyclist starts from a condition in which the hand is only partially closed.

This riding condition, in which the cyclist grips the projection 11, is the most critical since the actual power arm L4 is relatively short and the cyclist starts from a condition in which the hand is practically closed. However, since as stated above the middle finger, the ring finger and the little finger rest on the actuation area 20 below the pivot pin 6, braking is possible and easy, in part as a result of the described curvature of the brake lever 2.

It should be noted that the actuation area 19 and the actuation area 20 overlap in part, preferably for at least 30%, more preferably for at least 50%.

Acceptable ranges, preferred ranges and preferred values of various sizes and size ratios of the control device 1 are indicated in TABLE 1.

TABLE 1

|  | Acceptable range | Preferred range | Preferred value |
|---|---|---|---|
| D1 | 0-15 mm | 3-10 mm | 6 mm |
| D2 | 84-94 mm | 80-90 mm | 84 mm |
| D3 | 50-70 mm | 55-65 mm | 60 mm |
| D4 | 20-40 mm | 25-35 mm | 30 mm |
| D3/D1 | >3.3 | >7 | 10 |
| D4/D1 | >1 | >3 | 5 |
| H1 | 30-55 mm | 35-48 mm | 42 mm |
| H2 | 5-30 mm | 10-20 mm | 14 mm |
| H3 | 47-62 mm | 50-58 mm | 54 mm |
| H4 | 35-50 mm | 40-45 mm | 42 mm |
| L1 | 20-30 mm | 23-27 mm | 24.6 mm |
| L2 | 68-88 mm | 73-83 mm | 78 mm |
| L3 | 46-66 mm | 50-60 mm | 55.6 mm |
| L4 | 18-38 mm | 23-33 mm | 27.8 mm |
| L5 | 30-40 mm |  | 35 mm |
| L6 | 18-22 mm |  | 20 mm |
| L7 | 38-46 mm |  | 42 mm |
| L8 | 52-64 mm |  | 58 mm |
| P1 | 35-65 mm | 40-55 mm | 45 mm |
| P2 | 6-26 mm | 10-20 mm | 16 mm |
| P3 | 58-78 mm | 63-73 mm | 67.5 mm |
| R1 | 45-55 mm | 48-52 mm | 50 mm |
| R2 | 30-38 mm | 32-36 mm | 34 mm |
| R3 | 47-60 mm | 50-56 mm | 53 mm |
| R4 | 50-62 mm | 53-59 mm | 56 mm |
| R5 | 30-45 mm | 33-38 mm | 35 mm |
| R6 | 10-30 mm | 13-20 mm | 15 mm |
| S | 2-12 mm | 4-8 mm | 6.5 mm |
| W1 | 20-40 mm | 25-35 mm | 30 mm |
| W2 | 6-26 mm | 10-20 mm | 16 mm |

It should be noted that the distance D1 of the pivot pin 6 of the brake lever 2 from the upper surface 12 of the support body 5 is substantially less than typical values of controls of the prior art, which are around 24 to 36 mm.

The ratio between the distance D3 of the point of application of force in the riding condition of FIG. 6 and the upper surface 12 of the support body 5 with respect to such a distance D1 is consequently substantially greater than the typical values of controls of the prior art, which are around 2.5.

It should also be noted that, in the case of the preferred values indicated above, the lever ratio, meant as the ratio between the actual power arm L2, L3, L4 respectively for the three riding conditions, and the actual resisting arm L1 is 3.17, 2.26, 1.13 respectively for the three riding conditions. Therefore, in all three riding conditions there is a mechanical advantage.

To control the derailleur, the lever 3 and the button lever 4 could be replaced by a single lever with double direction of actuation, by a pair of levers, by a pair of button levers, or also one or both could be replaced, in the case of control of an electrical/electronic gearshift, by a control button for a switch, with one or more levers being possibly provided to actuate the button.

The control device 1 could also not be of the integrated type, with the lever 3 and the button lever 4 being omitted.

Vice-versa, the control device could comprise further elements, such as one or more buttons, with possible associated levers, to control an electronic device such as a cycle computer.

What is claimed is:

1. A control device for a bicycle with curved handlebars, comprising a support body fixable to the handlebars of the bicycle, and a brake lever pivoted to the support body, a resisting arm of which, in use, integrally moves with an end of a brake cable, the support body having a grippable distal-upper projection, the brake lever having a first actuation area and a second actuation area, wherein the first actuation area is associated with a first condition of use where the support body is gripped, and the second actuation area is associated with a second condition of use where the projection is gripped, wherein a pivot pin of the brake lever is below and at a first distance from an upper surface of the support body between 0 and 15 mm, a distance between the pivot pin of the brake lever and a point of integral movement of the brake cable and the brake lever is between 20 and 30 mm, and the brake lever has a curvilinear progression that extends an entire length of the lever, wherein from an end attached to the support body to a free end of the brake lever, the curvilinear progression consists of: a first convexity towards a distal side having a first radius of curvature for a first distance, a first concavity towards the distal side having a second radius of curvature for a second distance, a second convexity towards the distal side having a third radius of curvature for a third distance, and a second concavity towards the distal side having a fourth radius of curvature for a fourth distance.

2. A control device according to claim 1, wherein the distal-upper projection extends from a flattened portion of the upper surface of the support body for a height between 30 mm and 55 mm to define the distal-upper projection's upper end, the distal-upper projection comprises a base, and the upper end and the base extend in a respective distal or proximal direction, wherein the upper end extends for a length between about 6 mm and about 26 mm in a direction extending from a proximal surface to a distal surface of the upper projection and the base extends for a length between about 35 mm and 65 mm.

3. The control device according to claim 1, wherein the first radius of curvature is between about 45 mm and 55 mm.

4. The control device according to claim 1, wherein the first distance of the first convexity is between about 30 mm and 40 mm.

5. The control device according to claim 1, wherein the second radius of curvature is between about 30 mm and about 38 mm.

6. The control device according to claim 1, wherein the second distance of the first concavity is between about 18 mm and 22 mm.

7. The control device according to claim 1, wherein the third radius of curvature is between about 47 mm and about 60 mm.

8. The control device according to claim 1, wherein the third distance of the second convexity is between about 38 mm and 46 mm.

9. The control device according to claim 1, wherein the fourth radius of curvature is between about 50 mm and 62 mm.

10. The control device according to claim 1, wherein the fourth distance of the second concavity is between about 52 mm and 64 mm.

11. The control device according to claim 1, wherein the brake lever, at the first actuation area associated with the first condition of use where the support body is gripped, has an upper portion having said second convexity facing towards a distal side of the brake lever, and a bottom portion having said second concavity facing towards the distal side.

12. The control device according to claim 1, wherein the brake lever, at the second actuation area associated with the second condition of use, has an upper portion having said first convexity facing towards a distal side of the brake lever, an intermediate portion having said first concavity facing towards the distal side, and a bottom portion having said second convexity facing towards the distal side.

13. The control device according to claim 1, wherein the brake lever further has a third actuation area that is associated with a third condition of use where the handlebars are gripped.

14. The control device according to claim 13, wherein the brake lever, at the third actuation area, has said second concavity facing towards the distal side.

15. A control device according to claim 1, wherein a ratio between a distance associated with a point of application of force within said first actuation area as measured from the upper surface of the support body and said first distance is greater than 3.3.

16. A control device according to claim 1, wherein a ratio between a distance associated with a point of application of force within said second actuation area as measured from the upper surface of the support body and said first distance is greater than 1.

17. A control device according to claim 1, wherein a ratio between a distance associated with a point of application of a force within said first actuation area as measured from the pivot pin of the brake lever and the distance between the pivot pin of the brake lever and a point of integral movement of the brake cable and the brake lever is between 1.5 and 3.3.

18. A control device according to claim 1, wherein a ratio between a distance associated with a point of application of a force within said second actuation area as measured from the pivot pin of the brake lever and the distance between the pivot pin of the brake lever and a point of integral movement of the brake cable and the brake lever is between 0.6 and 1.9.

19. A control device according to claim 1, wherein the end of the brake cable is made to integrally move with the brake lever through insertion of a head thereof in an idle pin fixed to the brake lever.

20. A control device according to claim 1, wherein the brake lever has one or more weight reduction holes.

21. A control device according to claim 1, wherein the brake lever at the first actuation area, has an upper portion having said second convexity facing towards the distal side of the brake lever, and a bottom portion having said second concavity facing towards the distal side.

22. A control device according to claim 1, wherein the brake lever, at the second actuation area, has an upper portion having said first convexity facing towards the distal side of the brake lever, an intermediate portion having said first concavity facing towards the distal side, and a bottom portion having said second convexity facing towards the distal side.

23. A control device for a bicycle with curved handlebars, the control device comprising:
 a support body that has a grippable distal-upper projection, is adapted for mounting on a bicycle handlebar, and has a brake lever that is pivotally mounted to the support body by a pivot pin and receives a brake cable end,
 the brake lever has a first actuation area associated with when the support body is gripped in a first condition of use and has a second actuation area associated with when the distal-upper projection is gripped in a second condition of use,
 wherein the pivot pin of the brake lever is located at a first distance from an upper surface of the support body that is between 0 and 15 mm,
 the pivot pin of the brake lever and the brake cable end are spaced at a distance between 20 and 30 mm, and
 the brake lever has a curvilinear progression that extends an entire length of the lever, wherein from an end attached to the support body to a free end of the brake lever, the curvilinear progression consists of: a first convexity towards a distal side having a first radius of curvature for a first distance, a first concavity towards the distal side having a second radius of curvature for a second distance, a second convexity towards the distal side having a third radius of curvature for a third distance, and a second concavity towards the distal side having a fourth radius of curvature for a fourth distance.

24. A control device according to claim 23, wherein the projection further projects inwards with respect to an inner side of the support body, forming a recess intended to receive the rider's thumb in said second riding condition.

25. A control device according to claim 24, wherein the projection projects inwards with respect to the inner side of the support body by a distance at an upper end between 2 and 12 mm.

26. A control device according to claim 23, wherein the projection is convex in a distal-outer part thereof.

27. A control device according to claim 26, wherein said convexity has a radius of curvature between 30 and 45 mm.

28. A control device according to claim 23, wherein the projection is convex in an upper-outer part thereof.

29. A control device according to claim 28, wherein said convexity has a radius of curvature between 10 and 30 mm.

30. A control device according to claim 23, wherein the projection has a distal surface extending above the brake lever.

31. A control device according to claim 30, wherein said distal surface extends for a height between 5 and 30 mm above the brake lever.

32. A control device according to claim 23, wherein a ratio between a distance associated with a point of application of force within said first actuation area as measured from the upper surface of the support body and said first distance is greater than 3.3.

33. A control device according to claim 23, wherein a ratio between a distance associated with a point of application of force within said second actuation area as measured from the upper surface of the support body and said first distance is greater than 1.

34. A control device according to claim 23, wherein a ratio between a distance associated with a point of application of a force within said first actuation area as measured from the pivot pin of the brake lever and the distance between the pivot pin of the brake lever and a point of integral movement of the brake cable and the brake lever is between 1.5 and 3.3.

35. A control device according to claim 23, wherein a ratio between a distance associated with a point of application of a force within said first actuation area as measured from the pivot pin of the brake lever and the distance between the pivot pin of the brake lever and a point of integral movement of the brake cable and the brake lever is between 0.6 and 1.9.

36. A control device according to claim 23, wherein the brake lever, at the first actuation area, has an upper portion having said second convexity facing towards the distal side of the brake lever, and a bottom portion having said second concavity facing towards the distal side.

37. A control device according to claim 23, wherein the brake lever, at the second actuation area, has an upper portion having said first convexity facing towards the distal side of the brake lever, an intermediate portion having said first concavity facing towards the distal side, and a bottom portion having said second convexity facing towards the distal side.

38. A control device according to claim 23, wherein the brake lever further has a third actuation area that is associated with a third condition of use where the handlebars are gripped.

39. A control device according to claim 38, wherein the brake lever, at the third actuation area, has said second concavity facing towards the distal side.

40. A control device according to claim 23, wherein the end of the brake cable is made to integrally move with the brake lever through insertion of a head thereof in an idle pin fixed to the brake lever.

41. A control device according to claim 23, wherein the brake lever has one or more weight reduction holes.

42. The control device of claim 23, wherein the brake lever at the second actuation area has an upper portion having the first convexity facing towards the distal side of the brake lever, an intermediate portion having the first concavity facing towards the distal side, and a bottom portion having the second convexity facing towards the distal side, the brake lever further has a third actuation area that is associated with a third condition of use where the handlebars are gripped and the third actuation area has the second concavity facing towards the distal side, wherein the first concavity of the intermediate portion of the second actuation area has a radius of curvature that is approximately 60% of a radius of curvature of the second concavity of the third actuation area.

43. The control device of claim 23, wherein the first radius of curvature is between about 45 mm and 55 mm.

44. The control device of claim 23, wherein the first distance of the first convexity is between about 30 mm and 40 mm.

45. The control device of claim 23, wherein the second radius of curvature is between about 30 mm and about 38 mm.

46. The control device of claim 23, wherein the second distance of the first concavity is between about 18 mm and 22 mm.

47. The control device of claim 23, wherein the third radius of curvature is between about 47 mm and about 60 mm.

48. The control device of claim 23, wherein the third distance of the second convexity is between about 38 mm and 46 mm.

49. The control device of claim 23, wherein the fourth radius of curvature is between about 50 mm and 62 mm.

50. The control device of claim 23, wherein the fourth distance of the second concavity is between about 52 mm and 64 mm.

51. A control device according to claim 23, wherein the first actuation area and the second actuation area overlap for at least 30% of their respective lengths.

* * * * *